United States Patent [19]
Anderson

[11] Patent Number: 5,181,817
[45] Date of Patent: Jan. 26, 1993

[54] FASTENER

[75] Inventor: George E. Anderson, Champlin, Minn.

[73] Assignee: Crown Iron Works Company, Minneapolis, Minn.

[21] Appl. No.: 765,123

[22] Filed: Sep. 25, 1991

[51] Int. Cl.⁵ .............................................. F16B 33/00
[52] U.S. Cl. .................................... 411/369; 411/371; 411/379; 411/542; 411/915
[58] Field of Search ............... 411/369, 371, 372, 374, 411/429, 368, 373, 396, 377, 533, 542, 915, 537, 379, 380; 292/307 R

[56] References Cited

U.S. PATENT DOCUMENTS

| | | | |
|---|---|---|---|
| 972,140 | 10/1910 | Adam | 411/429 |
| 1,046,600 | 12/1912 | Kahler | 411/537 |
| 1,254,514 | 1/1918 | Lehmann | 411/429 |
| 2,020,522 | 11/1935 | Seguin | 411/374 |
| 2,590,803 | 3/1952 | Unger et al. | 411/369 X |
| 2,726,009 | 12/1955 | Murdock, Sr. et al. | 411/429 X |
| 3,606,357 | 9/1971 | Yonkers | 411/371 X |
| 4,367,060 | 1/1983 | Berecz | 411/303 |
| 4,826,380 | 5/1989 | Henry | 411/429 X |
| 4,944,644 | 7/1990 | Bell | 411/372 |

FOREIGN PATENT DOCUMENTS

| | | | |
|---|---|---|---|
| 459202 | 4/1928 | Fed. Rep. of Germany | 411/369 |
| 9962 | 1/1978 | Japan | 411/371 |
| 46475 | 3/1909 | Switzerland | 411/374 |
| 527930 | 10/1940 | United Kingdom | 411/374 |
| 603268 | 6/1948 | United Kingdom | 411/374 |
| 8604966 | 8/1986 | World Int. Prop. O. | 411/371 |

Primary Examiner—Rodney M. Lindsey
Attorney, Agent, or Firm—Lawrence M. Nawrocki

[57] ABSTRACT

A fastener for securing an attachment such as a guiderail to a surface of a wall. Such an attachment is provided with an internally-threaded aperture to receive the externally-threaded shank of a bolt passed through an aperture in the wall to which the attachment is to be mounted. The fastener includes a hardened washer and a bolt. The bolt is passed through registered apertures in the washer and the mounting wall and then threaded into the internally-threaded aperture in the attachment. The aperture in the washer can be conical in shape so that the shank of the bolt can be accommodated even where the aperture in the attachment is mis-tapped so that the bolt does not extend perpendicular to the wall of the attachment. The outer peripheral surface of the washer is threaded, and a cap is provided with internal threading compatible with the threads formed in the outer peripheral surface of the washer. As a result, the cap can be threaded tightly against the outer surface of the mounting wall when the attachment is secured to the inner surface of the mounting wall.

5 Claims, 1 Drawing Sheet

FASTENER

TECHNICAL FIELD

The present invention deals broadly with the field of fasteners. More narrowly, however, the invention is related to technologies wherein an attachment is to be secured to a wall having, as a function, the confining of a fluid. A specific focus of the invention is a fastener for securing a guiderail or other structure to the wall of an extractor device confining a miscella therewithin.

BACKGROUND OF THE INVENTION

Various technologies exist wherein attachments must be secured, either internally or externally to a reservoir wall constraining a fluid therewithin. Typically, the attachment or attachments must be secured internally within the reservoir.

Illustrative of such technology is U.S. Pat. No. 4,751,060 which is owned by the assignee of rights in the present invention. That particular document illustrates various walls, baffles, and guiderails secured internally within a reservoir defining an extractor. Such a structure can, typically, be used for extracting liquid petroleum by-products from solid granulate tarsands, meat by-products from bulk meats, etc. The reservoir contains a miscella made up of a liquid solvent, either toxic or non-toxic, and the by-product to be extracted.

In any case, however, while the present invention has applicability to a wall oreinted in any direction, such a device is illustrative of pools and/or baths wherein an attachment or attachments are mounted to an inner surface of a generally-vertical, lateral wall defining the reservoir and confining the miscella. A reservoir such as that discussed herein must have a number of characteristics in order to function optimally. These include strength in securing the attachment at the desired location, adequacy in sealing at the point of attachment to minimize, if not fully preclude, leakage, and accessibility to the securing means so that repairs or maintenance can be performed without having to withdraw, for example, a bolt or stud securing the attachment in place without having to drain the reservoir prior to effecting performance of such functions.

A solution devised included passing a stud through an aperture in the wall defining the reservoir and into an internally threaded aperture in the attachment. One or more sealing gaskets were then placed over the externally-extending portion of the stud. Typically, a tetrofluoroethylene gasket was first placed over the exposed portion of the stud and into engagement with an outwardly facing surface of the reservoir-defining wall. A fiber gasket was then placed over the stud in engagement with the tetrofluoroethylene gasket. An acorn nut was employed and tightened down on a distal end of the stud to tighten the washers or gaskets into engagement with the outwardly facing surface of the wall and the attachment into engagement with the inwardly facing surface of the wall.

Such a solution had a number of drawbacks. First, since the aperture in the reservoir-defining wall was typically oblong so that it could be made to register with the internally-threaded aperture in the attachment regardless of where that aperture was disposed because of minor variations in position, high loads frequently resulted in shifting of the gaskets. This had as a consequence the weakening of the seal and inability to support full bolt torque.

In some applications, the reservoir-defining wall and attachment are radiused. This solution was inadequate in view of the fact that, in such applications, leaks resulted.

In view of the fact that the stud was threaded at both ends, it frequently happened that, for example, the stud was threaded too deeply into the internally-threaded aperture in the attachment. As a result, too little threading was available for securing of the acorn nut to the externally-extending end of the stud. Conversely, when inserting the stud into the attachment, too short a portion of the stud was threaded into the attachment in order to ensure availability of adequate threading at the other end to accommodate the acorn nut. In either case, however, the point of attachment had the potential of proving too weak.

Finally, this solution was deficient in another major respect. If there was a leak, the reservoir had to be drained at least to a level below the point of attachment prior to repairing the leak. This was so since, when the acorn nut was unthreaded from the stud, no sealing or attachment was any longer maintained.

A second solution was proposed to effect mounting and sealing of an attachment to the reservoir-defining wall. This included employment of a high-strength bolt having a fiber gasket in engagement with the head thereof, the boss or shank of the bolt being inserted through the aperture in the wall and threaded down into the internally-threaded aperture in the attachment. A ½ coupling was, previously, welded to the outwardly-facing surface of the wall at a location to enclose the aperture within the perimeter thereof. After the bolt was tightened down to secure the attachment, the chamber defined within the ½ coupling was then closed by employment of a plug which was, typically, threaded into an end of the ½ coupling. The chamber defined within the ½ coupling was, if desired, sealed by means of a pipe seal compound.

This proposed solution had certain advantages over the solution discussed above. For example, it was able to employ an off-the-shelf bolt, while the stud in the previous solution was, typically, expensive to obtain, particularly if a sophisticated material was used. Additionally, when a high-strength bolt was employed, full load capacity was able to be achieved. As a result, there was less likelihood of shifting or loosening. Finally, the means of securing could be worked upon without disturbing the bolt or load capacity.

Never-the-less, this solution still had certain inherent deficiencies. For example, because the ½ coupling was welded to the reservoir-defining wall, certain problems arose. The weld proved costly and subjected the wall to distortion. Additionally, it was difficult to elongate the aperture in the reservoir-defining wall to any significant extent. As will be recalled, such an elongation can be necessary to ensure registration of the aperture with that in the attachment. Furthermore, the ½ coupling defined a chamber in which noxious substances might accumulate if sealing was not adequate. When the plug was removed, these substances were free to escape.

It is to these problems and dictates of the prior art that the present invention is directed. It is a fastening structure which addresses these problems and dictates and provides improved means for securing an attachment to an inner surface of a wall confining a fluid therewithin.

SUMMARY OF THE INVENTION

The present invention is an improved fastener for securing an attachment to an inner surface of a wall in which a fluid is confined. The attachment has, formed therein, an internally-threaded aperture to receive an externally-threaded boss. The boss is made to pass through an aperture in the wall defining the reservoir confining the fluid. The aperture in the wall is registered with the internally-threaded aperture in the attachment. The fastener includes a hardened washer having an aperture formed therethrough. The washer aperture, it is intended, is registered with the aperture in the fluid-confining wall when the washer is brought into engagement with an outer surface of the wall. An outer peripheral surface of the washer has threads defined therewithin. The fastener also includes a bolt which includes the externally-threaded boss to be threaded into the aperture formed in the attachment. The bolt includes a head at an end thereof opposite the end to be received in the aperture in the attachment. The boss of the bolt is able to be passed through the aperture in the hardened washer and the aperture in the liquid-confining wall. It is then threaded into the internally-threaded aperture in the attachment to tighten the attachment securely against the inner surface of the fluid-confining wall. The fastener in accordance with the present invention also includes a cap which has a cylindrical chamber formed therewithin. The chamber is defined by a wall having a cylindrical inner surface, the wall being internally threaded in a manner compatible with the threads formed in the outer peripheral surface of the hardened washer. As a result, the cap is able to be threaded tightly against the outer surface of the fluid-confining wall when the attachment is tightly secured to the inner surface of said wall.

In a preferred embodiment of the invention, a radially-inward wall which defines the aperture in the hardened washer is conical in shape, wherein, when the hardened washer is in engagement with the outer surface of the fluid-confining wall, the aperture in the washer has a larger diameter at an end of the aperture more closely proximate the outer surface of the fluid-confining wall. As a result, a widening annular space is formed between the inner surface defining the aperture in the washer and the boss of the bolt. In this embodiment, an elastomeric seal can be received within such a space. As a result, as the bolt is tightened down, the elastomeric seal, in view of the sloping wall defining the space, is compressed to more efficiently seal an interface between the hardened washer and the fluid-confining wall.

A number of materials are envisioned as appropriately functioning as this elastomeric seal. Among these are a fluorinated polymer marketed as TEFLON ® and stretched polytetrafluoroethylene marketed as GORTEX ®.

In the preferred embodiment wherein the radially-inward wall defining the aperture in the washer is conical, it will be seen that better accommodation is afforded for bolts which vary from a perpendicular to the fluid-containing wall. In some instances, the aperture drilled and tapped into the attachment varies from an intended perpendicular orientation. Consequently, the angle with respect to the fluid-confining wall defining the reservoir will be other than 90°. As will be able to be seen then in view of this disclosure, the conical, expanding aperture in the washer will accommodate such deviations of the bolt from a perpendicular orientation with respect to the fluid-confining wall without sealing integrity being sacrificed. The angular deviation of the bolt from a normal perpendicular orientation will be accommodated by the washer and 100% sealing integrity will still be maintained.

In one embodiment of the invention, an axially-facing surface of the cap which normally engages the outer surface of the fluid-confining wall when the cap is tightened against the wall can be sealed against the wall. An O-ring elastomer can be used for this purpose. When such an elastomer is utilized, it can be received within a groove formed in the axially-facing surface of the cap or merely be sandwiched between that surface and the outer surface of the fluid-confining wall.

In other embodiments, other means for sealing this interface can be employed. For example, a gasket of appropriate material could be utilized.

The present invention is thus an improved fastener for securing an attachment to a fluid-confining wall and effectively sealing at the point of securement. More specific features and advantages obtained in view of those features will become apparent with reference to the DETAILED DESCRIPTION OF THE INVENTION, appended claims, and accompanying drawing figures.

DETAILED DESCRIPTION OF THE INVENTION

Figure 1:
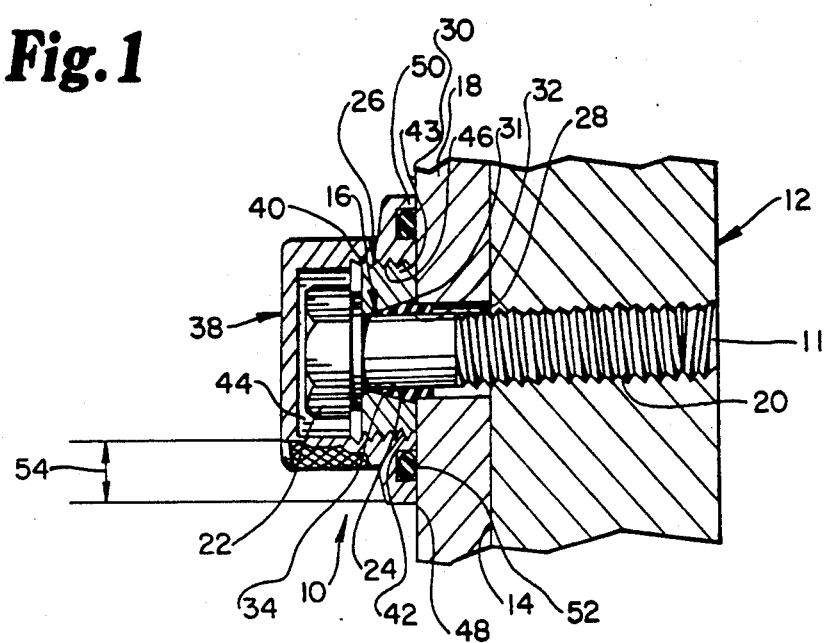
FIG. 1 is a side elevational, sectional view illustrating the present invention wherein a bolt utilized in the invention is shown as being perpendicular to a fluid-confining wall defining a reservoir.

Referring now to the drawing wherein like reference numerals denote like elements throughout the several views, FIG. 1 illustrates a fastener 10 in accordance with the present invention wherein an aperture 11 tapped into an attachment 12 (as, for example, a guiderail) is perpendicular to an outwardly facing surface 14 of the attachment 12. Consequently, a bolt 16 threaded into the aperture 11 in the attachment 12 extends generally perpendicular to the wall 18 of the structure, since the structure's wall 18 is flush with the outwardly-facing surface 14 of the attachment 12.

The fastener 10 in accordance with the present invention includes the bolt 16 the bolt 16 having a shank or boss 20 which extends from a head 22 which is shown as being faceted. The bolt's shank or boss 20 is shown as extending through an aperture 24 formed generally centrally within a hardened washer 26, through an aperture 28 in a mounting, or fluid-confining, wall 18, and into a threaded aperture 11 in the attachment 12. The bolt 16 is tightened down to effect secure mounting of the attachment 12 by rotating the shank or boss 20 of the bolt 16 to thread the shank or boss 20 into the threaded aperture 11 in the attachment 12. The washer 26 is of a material to effect sealing between the outer surface 30 of the mounting wall 18 and the head 22 of the bolt 16. The inner surface 31 of the washer 26 can be textured (not shown) in some manner to retard migration of the washer 26 relative to the mounting wall 18. Such texturing could comprise concentric annular rings etched into the surface 31 of the washer 26 or any other appropriate texturing means.

Figure 2:
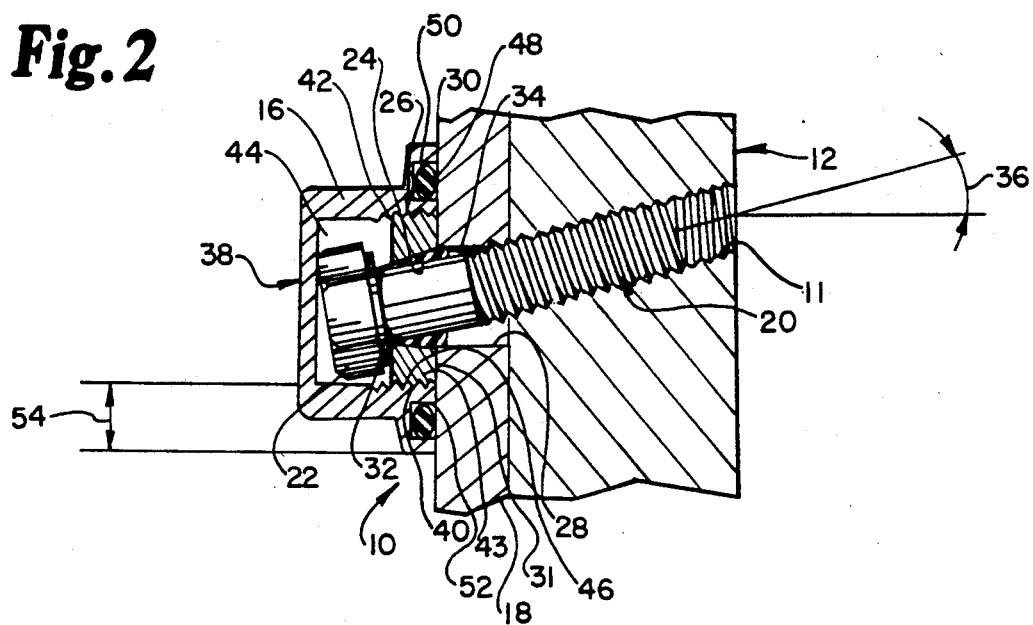
FIG. 2 is a side elevational, sectional view illustrating the present invention wherein a bolt utilized in the invention is shown at an angle divergent from an orientation perpendicular to a fluid-confining wall defining the reservoir.

As seen in both FIGS. 1 and 2, however, the central aperture 24 in the hardened washer 16 is shown as being defined by a radially-inward surface which is conical. An expanding annular space 32, going from left to right in FIGS. 1 and 2, is thereby defined between the radially-inward surface defining the aperture 24 in the washer 26 and the shank or boss 20 of the bolt 16.

In the embodiment illustrated, an elastomeric seal 34 is shown as being received within this space 32. Such a seal 34 functions to more efficiently accomplish sealing of this interface. Such an elastomeric seal 34 can be formed of any appropriate material. It has been found that a GORTEX ® loop is one appropriate material. A TEFLON ® loop and a paste cement have also been found to be appropriate for this purpose.

Because of the sloping wall of the conical space 32 between the shank 20 of the bolt 16 and the radially inner face within the washer 26, as the bolt 16 is tightened down, the elastomeric seal 34 becomes more greatly pressed to more efficiently seal at this location. This will be true even when the aperture 11 in the attachment 12 is tapped at a deviant angle from a perpendicular to a surface 14 of the attachment 12 as reflected by exaggerated angle 36 in FIG. 2. The sloped surface will permit angling of the bolt shank 20 relative to the washer 26 without distortion of the washer 26, and commensurate leaking around the washer 26, occurring. The elastomeric seal 34 received within the conical space 32 will, however, deform, and this deformation will facilitate sealing rather than detract from sealing. As a result, even where the bolt 16 is not properly aligned, or where the bolt 16 is not on-center, one hundred percent (100%) sealing integrity will still be maintained.

Both figures illustrate a cap 38 as being placed over the head 22 of the bolt 16 and engaged with the outwardly facing surface 30 of the mounting wall 18. The radially-outward surface 40 of the washer 26 is provided with threading 42, and the entry end 43 to a chamber 44 defined within the cap 38 is provided with compatible internal threading 46. The cap 38 can, thereby, be tightened down on the washer 26 so that an axially-facing surface 48 of the cap 38 is brought into engagement with the outwardly-facing surface 30 of the mounting wall 18.

More optimal sealing can be effected by providing sealing means at the interface between this axially-facing surface 48 of the cap 38 and the outer surface 30 of the mounting wall 18. This can be accomplished in a number of ways. An O-ring 50 can be interposed between these two surfaces 30, 48, and interposition can be either with the O-ring 50 received within an annular groove 52 (as shown in the figures) formed within one of the surfaces 30, 48 or without the O-ring 50 being received within a groove. In either case, however, the cap 38 is shown as being provided with a radially expanded dimension (as at 54) at the interface between the axially-facing surface 48 of the cap 38 and the outer surface 30 of the mounting wall 18. Even when a seal is not provided, the greater radial dimension of interface facilitates better sealing.

It will be understood that other types of seals could also be employed at this location. For example, a conventional gasket material annular seal could also be interposed instead of an O-ring.

It will be understood that the leak-resistant aspect of the fastener 10 could be enhanced by filling the chamber 44 within the cap 38 with an appropriate packing material. A fluorinated polymer paste and pipe compound have been found to be appropriate for this purpose.

In view of the construction of the fastener 10 in accordance with the present invention, it can be seen that, even when a packing material is employed, the cap 38 can still be removed without destroying fluid flow resistance through the aligned apertures 11, 24, 28. With the cap 38 removed, the bolt 16 is still in place securing the attachment 12 to the mounting wall 18, and adjustments, maintenance, and correction can be effected without destroying the resistance to fluid flow.

As will be understood, other variations are specifically contemplated as being within the scope of the invention. For example, a substantially rigid, although pliable, seal could be provided for insertion into the conical space 32 defined between the hardened washer 26 and the shank 20 of the bolt 16 to effect sealing at the interface therebetween.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A fastener for securing an attachment to an inner surface of a wall confining a fluid, wherein the attachment has an internally-threaded aperture formed therein to receive an externally-threaded boss passing through an aperture in the wall registered with the aperture and the attachment, comprising:

(a) a hardened washer having a central aperture formed therethrough and threads formed in an outer peripheral surface thereof, said washer aperture being defined, along its full axial length as it extends through an axial dimension of said hardened washer, by a conical surface wherein said aperture, when said hardened washer is in engagement with the outer surface of the fluid-confining wall, has a larger diameter at an end of said aperture more closely proximate the outer surface of the fluid-confining wall, and said washer aperture being registrable with the aperture in the fluid-confining wall when said washer is brought into engagement with an outer surface of the wall;

(b) a bolt including the externally threaded boss and a head at one end of said boss having a diameter larger than said aperture formed in said hardened washer, said boss of said bolt being able to be passed through said aperture in said hardened washer and the aperture in the liquid-confining wall and threaded into the internally-threaded aperture formed in the attachment when the hardened washer is in engagement with the outer surface of the fluid-confining wall to tighten the attachment securely against the inner surface of the fluid-confining wall; and (c) a cap having a cylindrical chamber formed therewithin, said chamber having a defining wall, internally threaded compatibly with threads formed in said outer peripheral surface of said hardened washer, wherein said cap is able to be threaded tightly against the outer surface of the fluid-confining wall when the attachment is tightly secured to the inner surface of the fluid-confining wall wherein said washer aperture defines, when said boss of said bolt is passed therethrough, a widening annular space between said conical surface defining said aperture and said boss of said bolt, and further comprising an annular elastomeric seal receivable within said space, wherein as said bolt is tightened down, said elastomeric seal is compressed to more efficiently seal and interface between said hardened washer and the fluid-confining wall.

2. The fastener of claim 1 wherein said cap includes an axially-facing surface which engages the outer surface of the fluid-confining wall when said cap is tightened thereagainst, further comprising means for sealing an interface between said axially-facing surface of said cap and the outer surface of the fluid-confining wall.

3. The fastener of claim 2 wherein said sealing means comprises a resilient, elastomeric O-ring.

4. The fastener of claim 1 further comprising a paste material inserted into said chamber formed in said cap prior to said cap being threaded down against the outer surface of said fluid-confining wall.

5. The fastener of claim 4 wherein said paste comprises a tetrofluoroethylene material.

* * * * *